United States Patent
Wen et al.

(10) Patent No.: US 12,384,012 B2
(45) Date of Patent: Aug. 12, 2025

(54) TOOL PART SUITABLE TO BE USED IN HUMID ENVIRONMENT

(71) Applicant: SABIC GLOBAL TECHNOLOGIES B.V., Bergen op Zoom (NL)

(72) Inventors: Liang Wen, Shanghai (CN); Xin Kong, Shanghai (CN); Steve Chen, Shanghai (CN); Winson Gao, Shanghai (CN); Chaodong Jiang, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 600 days.

(21) Appl. No.: 17/638,936

(22) PCT Filed: Aug. 27, 2020

(86) PCT No.: PCT/EP2020/074036
§ 371 (c)(1),
(2) Date: Feb. 28, 2022

(87) PCT Pub. No.: WO2021/038015
PCT Pub. Date: Mar. 4, 2021

(65) Prior Publication Data
US 2022/0347828 A1 Nov. 3, 2022

(30) Foreign Application Priority Data

Aug. 30, 2019 (EP) .................................... 19194747

(51) Int. Cl.
*B25F 5/02* (2006.01)
*B25G 1/10* (2006.01)
*B29C 45/00* (2006.01)
*B29K 23/00* (2006.01)
*B29K 105/06* (2006.01)
*B29L 31/28* (2006.01)
*C08K 7/14* (2006.01)

(52) U.S. Cl.
CPC ............ *B25F 5/02* (2013.01); *B29C 45/0005* (2013.01); *C08K 7/14* (2013.01); *B25G 1/10* (2013.01); *B29K 2023/12* (2013.01); *B29K 2105/06* (2013.01); *B29L 2031/283* (2013.01)

(58) Field of Classification Search
CPC ......... B25F 5/02; B25G 1/10; B29C 45/0005; B29K 2023/12; B29K 2105/06; B29L 2031/283; C08K 2201/004; C08K 7/14; C08L 23/10

See application file for complete search history.

(56) References Cited

U.S. PATENT DOCUMENTS

2014/0073731 A1  3/2014 Inamdar
2017/0036378 A1  2/2017 Yanev et al.

FOREIGN PATENT DOCUMENTS

| CN | 101974180 A |   | 2/2011 |
| CN | 202644260 U |   | 1/2013 |
| CN | 105218951 A | * | 1/2016 |
| CN | 107501746 A |   | 12/2017 |
| CN | 112552584 A | * | 3/2021 |
| CN | 106397988 A |   | 7/2021 |
| CN | 117700889 A | * | 3/2024 |
| JP | 2003025254 A |   | 1/2003 |
| KR | 101325584 B1 | * | 11/2013 |
| WO | 2009080281 A1 |   | 7/2009 |

OTHER PUBLICATIONS

CN-105218951-A (Jan. 6, 2016) machine translation.*
CN-112552584-A (Mar. 26, 2021) machine translation.*
CN-117700889-A (Mar. 15, 2024) machine translation.*
KR-101325584-B1 (Nov. 6, 2013) machine translaiton.*
International Search Report for International Application No. PCT/EP2020/074036; International Filing Date Aug. 27, 2020; Date of Mailing Nov. 12, 2020; 13 pages.
Written Opinion for International Application No. PCT/EP2020/074036; International Filing Date Aug. 27, 2020; Date of Mailing Nov. 12, 2020; 8 pages.

* cited by examiner

*Primary Examiner* — Ana L. Woodward
(74) *Attorney, Agent, or Firm* — CANTOR COLBURN LLP

(57) ABSTRACT

The present invention relates to a tool part comprising a polymer composition. The tool part is suitable to be used in direct contact with water and/or in an environment with relative humidity equal to or higher than 55%. The present invention further relates to a process for the preparation of the tool part. The present invention also relates to a process for the preparation of the tool part. The present invention further relates to the use of the polymer composition for the preparation of the tool part.

18 Claims, No Drawings

TOOL PART SUITABLE TO BE USED IN HUMID ENVIRONMENT

CROSS REFERENCE TO RELATED APPLICATIONS

This application is a National Stage application of PCT/EP2020/074036, filed Aug. 27, 2020, which claims the benefit of European Application No. 19194747.2, filed Aug. 30, 2019, both of which are incorporated by reference in their entirety herein.

DESCRIPTION

The present invention relates to a tool part comprising a polymer composition. The tool part is suitable to be used in direct contact with water and/or in an environment with relative humidity equal to or higher than 55%. The present invention further relates to a process for the preparation of the tool part. The present invention also relates to a process for the preparation of the tool part. The present invention further relates to the use of the polymer composition for the preparation of the tool part.

Materials commonly used in tool parts are for example metal, ceramics and polymer. Polymer is advantageous over metal and ceramics thanks to its characteristics like light weight, easy processing into a shape, etc. A tool part comprising a polymer composition is known in the art. Engineering plastics are often used in the polymer composition for the desired durability. For example, JP2003025254A discloses a power tool handle made of polyamide; CN202644260U relates to a polyamide yarn cutting device. However, due to the hydrophilic nature of polyamide, tool parts comprising polyamide are not suitable to be used in humid environment or in direct contact with water. Polyolefin composition has also been used as tool part, for example CN101974180A discloses a polypropylene/short glass fiber composition which can be used as a tool housing, however housing made from this composition suffers from high warpage; CN106397988A discloses a polypropylene composition comprising a polypropylene-based polymer and an α-nucleating agent and a β-nucleating agent and garden power tools comprising said polypropylene composition. Although the said propylene composition exhibits a low shrinkage gap which leads to low warpage, the stiffness of said propylene composition is not high enough for heavy duty.

It is the aim of the present invention to provide a tool part with excellent stiffness, toughness and a low warpage; the tool part is suitable to be used in direct contact with water and/or in an environment with a relative humidity of equal to or higher than 55%.

The aim is achieved by a tool part comprising a polymer composition, wherein the polymer composition comprises a polymer and reinforcing fibers, wherein the number average length of the reinforcing fiber is in the range of 0.80 to 11.1 mm.

It is surprisingly found that the tool part according to the present invention is suitable to be used in direct contact with water and/or in an environment with relative humidity equal to or higher than 55% since the polymer composition in the tool part according to the present invention has very high retention of tensile strength. Moreover, the tool part according to the present invention also exhibits high stiffness, excellent toughness and low warpage.

Tool Part

A tool is an object used to extend the ability of an individual to modify features of the surrounding environment. The tool part according to the present invention refers to a part of tool which is essentially made of plastic. Suitable tool parts include but are not limited to covers or housings, handles or grips, and tool bases.

Preferably the tool part is a housing and/or a tool grip.

"Essentially made of plastic" is meant the amount of polymer composition of the present invention in the tool part is at least 50 wt %, preferably at least 60 wt %, preferably at least 70 wt %, preferably at least 80 wt %, preferably at least 90 wt %, most preferably 100 wt % based on the total amount of the tool part.

The tool part according to the present invention is part of a tool which can for example be a hand tool powered by human labor rather than by a motor, e.g. knife, wrench, plier, cutter, hammer, drill, saw, scissors; For example the tool can be a power tool which is actuated by an addition power source and mechanism other than sole manual labor, e.g. chainsaw, electric drill, lawn mower, grinder, electric trimmer. The power source commonly used in power tools includes but is not limited to electricity, compressed air and internal combustion engines.

The tool part according to the present invention is part of a tool which is suitable to be used in direct contact wih water and/or in a humid environment wherein the relative humidity is equal to or higher than 55%. For example the tool is a garden tool which includes but is not limited to lawn mower, leaf sweeper, chainsaw, leaf blower, branch trimmer, axe, scythe, pitchfork, spade, shovel, trowel, hoe, rake, fork.

The tool part according to the present invention is part of a tool which is suitable for heavy duty. such tools include but are not limited to hammer, pliers, saw, chainsaw, electric drill, grinder.

Preferably the tool part according to the present invention is part of a heavy duty tool for example electric drill, hammer or/and a garden tool, for example shovel, lawn mower.

The density of the tool part is preferably in the range from 1.08 to 2.51 $g/cm^3$, preferably in the range from 1.10 to 2.03 $g/cm^3$, more preferably in the range from 1.12 to 1.82 g/cm3 as measured according to ISO 1183-1:2019.

The tensile modulus of the tool part is preferably in the range from 5350 to 15000 MPa, more preferably in the range from 5355 to 10032 MPa, even more preferably in the range from 5358 to 9527 MPa as measured according to ISO 527-2:2012 where in the specimens are prepared by injection moulding and are conditioned for 48 hrs at 40° C. and 85% relative humidity before testing.

Polymer Composition

The polymer composition according to the present invention comprises a polymer and reinforcing fibers.

For the purpose of the present invention, the polymer composition is suitable to be used in direct contact with water and/or in an environment with relative humidity equal to or higher than 55%.

To avoid confusion "suitable to be used in direct contact with water and/or in an environment with relative humidity equal to or higher than 55%" means the after conditioning the test specimens of the polymer composition at 40° C. at 85% relative humidity for 48 hrs (Relative humidity (RH) is the ratio of the partial pressure of water vapor to the equilibrium vapor pressure of water at a given temperature), the tensile modulus of the polymer composition is at least 5350 MPa, preferably at least 6000 MPa, preferably at least 7000 MPa, preferably at least 8000 MPa tested at room temperature (23° C.) according to ISO 527-2:2012 and the impact resistance of the polymer composition is at least 20 KJ/m$^2$, more preferably at least 22 KJ/m$^2$, more preferably at least 25 KJ/m$^2$ tested at room temperature (23° C.) according to ISO 179-1:2010.

Preferably the retention of tensile strength of the polymer composition is at least 0.70, preferably at least 0.80, preferably at least 0.90, preferably at least 0.92, preferably at least 0.95. The retention of tensile strength is defined as the ratio between tensile strength tested on specimen conditioned for 48 hrs at 23° C. at 50% relative humidity and tensile strength tested on specimen conditioned for 48 hrs at 40° C. at 85% relative humidity tested according to ISO 527-2:2012 at room temperature (23° C.).

Preferably the polymer composition characterizes in that it satisfies the following inequation:

$$\frac{\text{Tensile modulus}}{1000} + 20^{\text{Retention of tensile strength}} > \frac{\text{Impact resistance}}{\text{Average fiber length}} \quad (1)$$

In the inequation (1), specimens used to determine the tensile modulus are conditioned at 40° C. at 85% relative humidity for 48 h prior to be tested according to ISO 527-2:2012 at room temperature (23° C.); specimens used to determine impact resistance are conditioned at 40° C. at 85% relative humidity for 48 h prior to be tested according to ISO 179-1:2010 at room temperature (23° C.); average fiber length refers to the number average length of the fiber in the polymer composition.

The polymer composition of the present invention is also characterized with low warpage. Warpage of a polymer composition can be quantified using shrinkage gap. For the purpose of the present invention, preferably the shrinkage gap of the polymer composition is at most 0.40%, preferably at most 0.38%, preferably at most 0.35%. The shrinkage gap is the difference between the shrinkage in the direction of the flow and the shrinkage in the perpendicular direction of the flow. The shrinkage can be measured for example according to the following procedure:

The specimens used to determine shrinkage are prepared by injection molding the materials into a plaque-shape mold with a dimension of 60 mm*60 mm*2 mm from the perpendicular direction of a flank (60 mm*2 mm).

Shrinkage is determined in both the flow direction and in the perpendicular direction of the flow based the size of the façade (slightly smaller than 60 mm*60 mm after shrinking) of the specimen after it cools down to room temperature (23° C.). Shrinkage is calculated according to the following equation:

$$\text{Shrinkage}_f = \frac{60 - l_f}{60} * 100\%$$

Wherein Shrinkage, is the shrinkage in the flow direction, 60 mm is the length of the specimen's façade before shrinking which equals to the length of the mold, $l_f$ is the length of the specimen's façade after shrinking in the flow direction. The shrinkage in the perpendicular direction of the flow can be calculated accordingly using the length of the specimen's façade after shrinking in the perpendicular direction of the flow.

Polymer

The polymer in the polymer composition of the present invention is preferably a non-polar polymer.

The term "non-polar polymer" means that the polymer comprises little polar moieties or is free of polar moiety. In a polar moiety, there is a separation of electric charge with a negatively charged end and a positively charged end. Typical polar moieties in polymer include but are not limited to alcohol, ether, carboxylic acid, amine, nitrile or mixtures thereof.

Preferably the amount of polar moiety in the polymer according to the present invention is at most 40 wt %, preferably at most 30 wt %, preferably at most 20 wt %, preferably at most 10 wt %, preferably at most 5 wt %, preferably at most 1 wt %, even more preferably 0 wt % based on the total amount of the polymer.

Suitable polymers include but are not limited to polystyrene and polyolefin.

Preferably the polymer in the polymer composition of the present invention is a polyolefin.

Preferably the polymer in the polymer composition of the present invention is a polypropylene.

For example the polypropylene may be a propylene homopolymer, a propylene random copolymer or a heterophasic propylene copolymer, preferably the polypropylene is a propylene homopolymer.

The process to produce polypropylene is known in the art. Preferably the polypropylene of the present invention is produced in a sequential polymerization process comprising at least two reactors, more preferably the polypropylene of the present invention is produced in a sequential polymerization process comprising at least three reactors.

The catalyst to produce polypropylene is also know in the art, for example Ziegler-Natta catalyst, metallocene catalyst. Preferably the catalyst used to produce the polypropylene of the present invention is free of phthalate, for example the catalyst comprises compounds of a transition metal of Group 4 to 6 of IUPAC, a Group 2 metal compound and an internal donor wherein said internal donor is a compound selected from optionally substituted malonates, maleates, succinates, glutarates, cyclohexene-1,2-dicarboxylates, benzoates and derivatives and/or mixtures thereof, preferably the internal donor is a citraconate.

Preferably the polymer in the polymer composition of the present invention is a polypropylene, wherein the melt flow index (MFI) of the polypropylene is in the range of 15 to 200 dg/min, preferably 30 to 100 dg/min according to ISO 1133:2011 at 230° C. with 2.16 kg load.

Preferably the amount of polymer in the polymer composition is in the range from 50 wt % to 90 wt %, preferably from 55 wt % to 80 wt %, more preferably from 57 wt % to 72 wt % based on the total amount of the polymer composition.

Reinforcing Fiber

In general fiber is a cylindrical substance where its length is significantly longer than the diameter of its cross section. It is know that fiber can be used to reinforcing polymer leading to improved mechanical properties, e.g. stiffness or/and toughness.

The amount of the reinforcing fiber is preferably in the range from 10 wt % to 50 wt %, preferably from 20 wt % to 45 wt %, more preferably from 28 wt % to 43 wt % based on the total amount of the polymer composition.

In the present invention, the number average diameter of the reinforcing fiber is in the range from 3 to 50 μm, preferably from 5 to 30 μm, more preferably from 7 to 25 μm, more preferably from 9 to 15 μm.

Fiber commonly used to reinforce polymer includes but is not limited to glass fiber, carbon fiber, aramid fiber, basalt fiber, paper fiber, wood fiber, asbestos fiber.

For the purpose of the present invention, it is preferred that the reinforcing fiber is inorganic fiber, for example glass fiber, carbon fiber or basalt fiber.

For the purpose of the present invention, it is preferred that the reinforcing fiber is glass fiber.

Both long reinforcing fiber (number average length of the fiber is in the range from 0.5 to 50 mm in the polymer composition) and short reinforcing fiber (number average length of the glass fiber is in the range is shorter than 0.5 mm in the polymer composition) can be used in the present invention.

Preferably, the reinforcing fiber used in the polymer composition according to the present invention is long reinforcing fiber.

The number average length of the reinforcing fiber in the polymer composition is in the range of 0.80 to 11.1 mm, preferably in the range of 2.0 to 10.5 mm, more preferably in the range of 4.0 to 8.3 mm. The number average length of the reinforcing fiber can be determined for example by incinerating the 5.0 g polymer composition specimen at 800° C. for 2 hrs, then measuring the lengths of glass fibers by observation via microscope, wherein the polymer composition specimen can be prepared by injection molding the polymer composition into a plaque with dimensions of 60 mm*60 mm*2 mm, then 5 g specimen can be cut from the injection molded plaque.

Additives/Impact Modifier

The polymer composition of the present invention may contain the usual additives, for instance nucleating agents and clarifiers, stabilizers, release agents, fillers, peroxides, plasticizers, anti-oxidants, lubricants, antistatics, cross linking agents, scratch resistance agents, high performance fillers, pigments and/or colorants, impact modifiers, flame retardants, blowing agents, acid scavengers, recycling additives, coupling agents, anti-microbials, anti-fogging additives, slip additives, anti-blocking additives, polymer processing aids and the like. Such additives are well known in the art. The skilled person will know how to choose the type and amount of additives such that they do not detrimentally influence the aimed properties.

In a preferred embodiment, the polymer composition of the present invention comprises impact modifier wherein the Shore-A hardness of the impact modifier is at most 98 according to ASTM D2240-15€1.

Process

The present invention further relates to the process to prepare the tool part.

The tool part according to the present invention can be prepared by injection molding the polymer composition of the present invention into desired shape.

The polymer composition of the present invention can be prepared by known techniques, for example pultrusion process, wherein a bundle of continuous reinforcing fiber filaments is spread out into individual filaments and drawn through an impregnation die, into which the molten polymer is injected, aiming at entirely wetting and impregnating each filament with the molten polymer. A strand of diameter of about 3 mm is drawn from the die and then cooled. Finally the strand is chopped into segments of the desired length. The glass fibers are generally parallel to one another in the segment, with each fiber being individually surrounded by the polymer.

For example the polymer composition of the present invention can be produced by wire-coating process as described in WO2009080281A1.

For example the polymer composition of the present invention can also be prepared by extrusion.

Preferably the polymer composition of the present invention is prepared by wire-coating process according to WO2009080281A1.

The present invention further relates to the use of the polymer composition of the present invention for preparation of a tool part.

The present invention further relates to the use of the polymer composition of the present invention for the preparation of an article suitable to be used in direct contact with water or in an environment with relative humidity higher than 55%.

EXAMPLES

Materials

All the materials used in the present invention are commercially available:

CE1: BASF Ultramid® B3ZG6, a polyamide based composition comprising 30 wt % glass fiber.

CE2: SABIC® PPCOMPOUND G3230A, a polypropylene based composition comprising 30 wt % short glass fiber.

CE3: SABIC® PPCOMPOUND G3240U, a polypropylene based composition comprising 40 wt % short glass fiber.

EX1: SABIC® STAMAX™ 30YK270, a polypropylene based composition comprising 30 wt % long glass fiber.

EX2: SABIC® STAMAX™ 40YM240, a polypropylene based composition comprising 40 wt % long glass fiber.

EX3: EX3 consists of 90 wt % SABIC® STAMAX™ 40YM240 and 10 wt % SABIC® FORTIFY™ C1055D.

Specimen Preparation

All the materials were provided under pellet form which were dried at 100° C. for 2 hrs in vacuum prior to be formed into specimens.

To prepare specimens of EX3, pellets of SABIC® STAMAX™ 40YM240 and of SABIC® FORTIFY™ C1055D were homogenized prior to be formed.

The specimens used to determine the impact resistance, tensile modulus, tensile strength, shrinkage and number average glass fiber length were prepared by injection molding using FANUC injection molding machine (S-2000i).

To prepared the specimens used for the determination of shrinkage and number average glass fiber length, materials were injection molded using a plaque-shape mold with a dimension of 60 mm*60 mm*2 mm from the perpendicular direction of a flank (60 mm*2 mm). The specimen used to determine number average glass fiber length was a piece of 5.0 g cut from the injection molded plaque.

Conditioning

Standard conditioning: Specimens were conditioned for 48 hrs at 23° C. and 50% relative humidity before testing;

Conditioning at high humidity: Specimens were conditioned for 48 hrs at 40° C. and 85% relative humidity before testing.

Test Methods

Impact resistance was obtained in a Charpy impact test performed at room temperature (23° C.) according to ISO 179-1:2010 on Toyoseiki Digital Impact DG-UB machine equipped with a pendulum of 5 J. The shape of specimen for this test is defined in the used norm.

Tensile modulus and tensile strength were obtained via tensile tests carried out at room temperature (23° C.) according to ISO 527-2:2012. The shape of specimen for this test is defined in the used norm.

Density was measured according to ISO 1183-1:2019 at 23° C. using the specimens for impact resistance measurement.

Shrinkage was determined in both flow direction and in the perpendicular direction of the flow based the size of the façade (slightly smaller than 60 mm*60 mm after shrinking) of the specimen after it cooled down to room temperature (23° C.). Shrinkage is calculated according to the following equation:

$$\text{Shrinkage}_f = \frac{60 - l_f}{60} * 100\%$$

Wherein Shrinkage, is the shrinkage in the flow direction, 60 mm is the length of the specimen's façade before it cools down which equals to the length of the mold, $l_f$ is the length in the flow direction of the specimen's façade after it cools down. The shrinkage in the perpendicular direction of the flow can be calculated accordingly using the specimen length of the specimen's façade after it cooled down.

The shrinkage gap is the difference between the shrinkage in the direction of the flow and the shrinkage in the perpendicular direction of the flow.

The number average length of the glass fiber was determined by incinerating the 5.0 g specimen at 800° C. for 2 hrs, then measuring the lengths of glass fibers by observation via microscope.

Result

The performance of all the examples are shown as below in Table 1:

TABLE 1

Performance of all the samples

| Testing Items | Unit | Conditioning | CE1 | CE2 | CE3 | EX1 | EX2 | EX3 |
|---|---|---|---|---|---|---|---|---|
| Number average glass fiber length | mm | — | 0.5 | 0.4 | 0.4 | 6.7 | 4.4 | 6.2 |
| Tensile Strength | MPa | Standard conditioning | 150 | 97 | 110 | 105 | 110 | 73.2 |
| Tensile Strength | MPa | Conditioning at high humidity | 100 | 96 | 108 | 101 | 109 | 71.1 |
| Retention of tensile strength | — | — | 0.67 | 0.99 | 0.98 | 0.96 | 0.99 | 0.97 |
| Tensile Modulus | MPa | Conditioning at high humidity | 5300 | 6440 | 8870 | 6567 | 8182 | 5381 |
| Impact resistance | KJ/m³ | Conditioning at high humidity | 35 | 15 | 12 | 23 | 29 | 30 |
| Inequation (1) is satisfied | — | — | False | False | False | True | True | True |
| Shrinkage (flow) | % | — | 0.23 | 0.22 | 0.25 | 0.20 | 0.21 | 0.19 |
| Shrinkage (perpendicular flow) | % | — | 0.66 | 0.88 | 0.82 | 0.53 | 0.51 | 0.49 |
| Shrinkage gap | % | — | 0.43 | 0.66 | 0.57 | 0.33 | 0.30 | 0.30 |
| Density | g/cm3 | — | 1.33 | 1.12 | 1.22 | 1.12 | 1.22 | 1.22 |

The tensile modulus after conditioning at high humidity of CE1 is too low for the purpose of the present invention. CE2, CE3 and all the inventive examples exhibit excellent tensile modulus after conditioning at high humidity, however only inventive examples have impact performance of higher than 20 KJ/m³ and shrinkage gap of smaller than 0.35%. Moreover, only inventive examples satisfy inequation (1).

As a result, only the inventive example are suitable to be used in a tool part which is to be used in high humidity environment with relative humidity equal to or higher than 55%.

The invention claimed is:

1. A tool part comprising a polymer composition, wherein the polymer composition comprises a polymer and reinforcing fiber, wherein the number average length of the reinforcing fiber is in the range 4.0 to 11.1 mm, wherein the polymer in the polymer composition is a polypropylene, wherein the melt flow index (MFI) of the polypropylene is in the range of 30 to 100 dg/min according to ISO 1133:2011 at 230° C. with 2.16 kg load, wherein the density of the tool part is in the range from 1.08 to 2.51 g/cm³ as measured according to ISO 1183-1:2019.

2. The tool part according to claim 1, wherein the amount of the reinforcing fiber is in the range from 10 wt % to 50 wt % based on the total amount of the polymer composition.

3. The tool part according to claim 1, wherein the number average length of the reinforcing fiber in the polymer composition is in the range of 4.0 to 8.3 mm.

4. The tool part according to claim 1, wherein the reinforcing fiber is an inorganic fiber.

5. The tool part according to claim 1, wherein the amount of the polymer composition in the tool part is at least 50 wt % based on the total amount of the tool part.

6. The tool part according to claim 1, wherein the retention of tensile strength of the polymer composition is at least 0.70, wherein the retention of tensile strength is the ratio between tensile strength tested on specimen conditioned for 48 hrs at 23° C. at 50% relative humidity and tensile strength tested on specimen conditioned for 48 hrs at 40° C. at 85% relative humidity tested according to ISO 527-2:2012 at room temperature (23° C.).

7. The tool part according to claim 1, wherein the tensile modulus of the polymer composition is at least 5350 MPa tested at 23° C. according to ISO 527-2:2012, wherein the test specimens of the polymer composition is conditioned at 40° C. at 85% relative humidity for 48 hrs.

8. The tool part according to claim 1, wherein the impact resistance of the polymer composition is at least 250 KJ/m² tested at 23° C. according to ISO 179-1:2010, wherein the test specimens of the polymer composition is conditioned at 40° C. at 85% relative humidity for 48 hrs.

9. The tool part according to claim 1 wherein the polymer composition characterizes in that it satisfies the following inequation:

$$\frac{\text{Tensile modulus}}{1000} + 20^{\text{Retention of tensile strength}} > \frac{\text{Impact resistance}}{\text{Average fiber length}}$$

wherein specimens used to determine the tensile modulus are conditioned at 40° C. at 85% relative humidity for 48 h prior to be tested according to ISO 527-2:2012 at 23° C.; specimens used to determine impact resistance are conditioned at 40° C. at 85% relative humidity for 48 h prior to be tested according to ISO 179-1:2010 at 23° C.; average fiber length refers to the number average length of the fiber in the polymer composition.

10. The tool part according to claim 1, wherein the polymer comprises a polar moiety, and the amount of polar moiety of the polymer in the polymer composition is at most 40 wt % based on the total amount of the polymer.

11. The tool part according to claim 1, wherein the polymer in the polymer composition is a polypropylene homopolymer.

12. The tool part according to claim 1, wherein the tool is an electric drill, a hammer, a shovel, or a lawn mower.

13. A process for the preparation of the tool part according to claim 1, comprising the step of injection moulding the polymer composition to obtain the tool part.

14. The process of claim 13, comprising producing the polymer composition by a wire-coating process.

15. A method of using a tool comprising the tool part of claim 1, the method comprising using the tool in direct contact with water or in an environment with relative humidity higher than 55%.

16. The tool part according to claim 1, wherein the polymer composition is produced by a wire-coating process.

17. The tool part according to claim 1, wherein the polymer composition is produced by extrusion.

18. The process of claim 13, comprising producing the polymer composition by extrusion.

* * * * *